United States Patent [19]

Lee

[11] Patent Number: 6,000,387
[45] Date of Patent: Dec. 14, 1999

[54] POWER SAW WITH FLUID COOLING BEARING ASSEMBLY

[76] Inventor: Wy Peron Lee, 11750 Sterling Ave., Suite C, Riverside, Calif. 92503

[21] Appl. No.: 09/063,646

[22] Filed: Apr. 20, 1998

[51] Int. Cl.$^6$ ....................................................... B28D 1/04
[52] U.S. Cl. ....................... 125/13.01; 83/171; 125/11.22
[58] Field of Search .............................. 125/13.01, 13.03, 125/11.22; 451/449–450; 83/171, 169, 168

[56] References Cited

U.S. PATENT DOCUMENTS

| | | | |
|---|---|---|---|
| 2,455,113 | 11/1948 | Coates ................................... | 125/13.03 |
| 2,851,764 | 9/1958 | White ................................... | 451/449 X |
| 3,635,206 | 1/1972 | Harclerode ........................... | 125/13.03 |
| 4,414,783 | 11/1983 | Vincent ................................. | 83/169 X |
| 4,428,159 | 1/1984 | Sigetich et al. ..................... | 125/13.03 X |
| 5,056,499 | 10/1991 | Chiuminatta et al. ............... | 125/13.03 X |
| 5,331,743 | 7/1994 | Lump ..................................... | 83/169 X |
| 5,477,844 | 12/1995 | Meister ................................ | 125/13.03 X |

*Primary Examiner*—David A. Scherbel
*Assistant Examiner*—Anthony Ojini
*Attorney, Agent, or Firm*—David and Raymond; Raymond Y. Chan

[57] ABSTRACT

A ceramic and masonry power saw is constructed with a fluid cooling bearing assembly to drive a saw blade. The fluid cooling bearing assembly includes a bearing housing which has a coolant chamber embracing around the shaft sleeve. The coolant chamber has a C-shaped cross section and is extended along the shaft sleeve. The bearing housing also provides a coolant inlet and a coolant outlet for sealedly connecting the coolant chamber with the coolant conduit arrangement. Therefore, the coolant would not only be pumped to cool the saw blade and the work piece to be cut, but also be pumped to flow inside the bearing housing for cooling the rotating blade shaft in order to prevent overheating of the blade shaft.

27 Claims, 7 Drawing Sheets

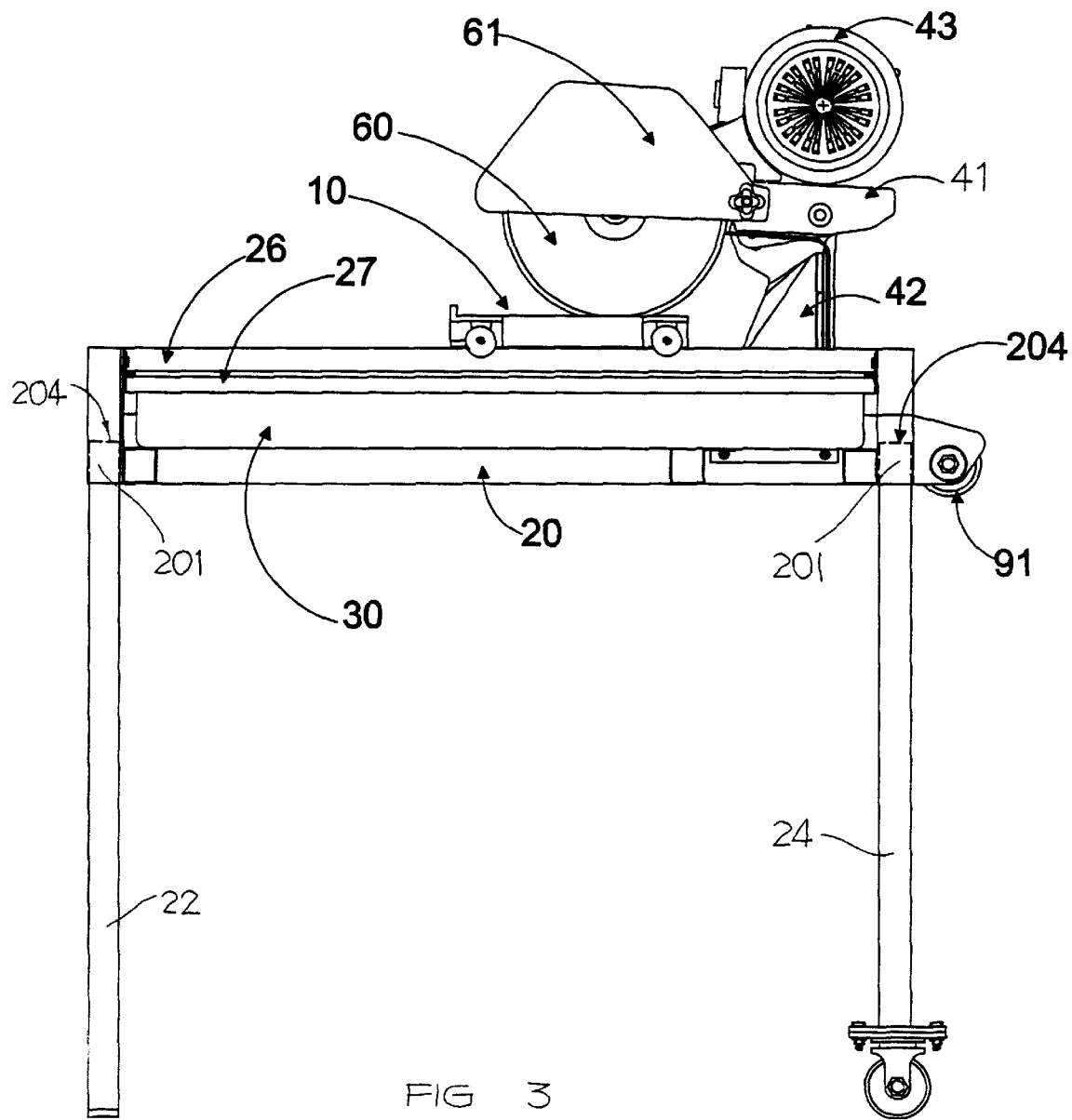

POWER SAW WITH FLUID COOLING BEARING ASSEMBLY

FIELD OF THE PRESENT INVENTION

The present to invention relates to power saw, and more particularly to a ceramic and masonry power saw with a fluid cooling bearing assembly that has a built-in fluid cooling system to internally cool down the heat of the bearing assembly so as to prolong the service life span thereof.

BACKGROUND OF THE PRESENT INVENTION

Power saw is a common machine specially used in cutting and shaping tile or other construction materials made of granite, marble, slate, pave, brick, ceramics, and masonry. The conventional power saw simply includes a cutting table supported on a supporting frame, a cutting head arrangement overhanging the cutting table with a circular diamond saw blade that is powered by an electric motor via a bearing assembly.

The cutting head arrangement is built around the frame includes a proximal end attached to the frame and a distal end to which the saw blade is mounted. The saw blade is rotatably mounted to a power output end of the bearing assembly and driven by a drive belt connected between the motor and a power input end of the bearing assembly.

Liquid coolant must be pumped to the saw blade and the work piece during cutting to reduce the accumulated heat and flush away sawdust. A nozzle is connected to a guard that covers a top portion of the saw blade to supply a stream of coolant to the saw blade, wherein the coolant is pumped in from a reservoir. A coolant tray must be installed underneath the cutting table to catch the liquid coolant flowing off of the cutting blade and sludge formed from the coolant mixing with the saw dust.

However, the conventional power saw bears a plurality of drawbacks as follows.

First, most of the power saw would break down due to the overheated of the bearing assembly. A great amount of heat is accumulated during the rotary transmission of the bearing assembly that may destroy the internal bearing construction. Normally, if the bearing assembly were continuously working for more than one hour, permanent damage would be caused to the bearing assembly because of overheated.

Second, to ensure excellent cutting performance, the bearings installed inside the bearing assembly are preferred to replace periodically. But, the conventional bearing assembly fails to provide a detachable feature, so that the user must replace the entire bearing assembly in higher expense.

Third, the conventional power saw requires the user to oftenly remove the coolant tray for emptying the collected coolant therein and cleaning it by demantling or detaching the cutting table and/or the supporting frame. The most efficiency way, up to now, is to pivot the cutting table up at side for removing the tray at side, that causes inconvenient to the user.

Fourth, the whole power saw, including the supporting frame, the cutting table and the cutting head arrangement, is very heavy that even two persons are unable to unload from or to put on a transportation vehicle.

SUMMARY OF THE PRESENT INVENTION

The main object of the present invention is to provide a power saw that comprises a fluid cooling bearing assembly connecting between an electric motor and a saw blade. The fluid cooling bearing assembly contains a built-in fluid cooling system to internally cool down the heat of the bearing assembly so as to prolong the service life span thereof.

Another object of the present invention is to provide a power saw having a fluid cooling bearing assembly, wherein the built-in fluid cooling system shares the fluid pump of the saw blade cooling system and the coolant collecting tray so as to eliminate the unnecessary cost for extra parts.

Still another object of the present invention is to provide a power saw having a fluid cooling bearing assembly that can be detached and reassembled easily.

Yet another object of the present invention is to provide a power saw with a fluid cooling bearing assembly, that has a feature of ease of emptying the coolant tray positioned underneath the cutting table.

One more object of the present invention is to provide a power saw having a detachable supporting frame that enables the user to easily unloading from or putting on a transportation vehicle.

In order to accomplish the aforesaid objects, the present invention provides a power saw comprising a cutting table mounted on a floor supporting frame which has a coolant tray disposed underneath the cutting table, and a cutting head arrangement supported above the cutting table. The cutting head arrangement includes a head platform pivotally mounted on the supporting frame, a motor mounted on a distal end of the head platform, a fluid cooling bearing assembly which is firmly secured to a proximate end of the head platform for rotatably mounting a circular saw blade, a transmission means connected between the motor and the fluid cooling bearing assembly.

The power saw further comprises a fluid pump for pumping fluid coolant from a coolant reservoir, which can be the coolant tray and any other independent container, via a coolant conduit arrangement, to a nozzle connected to a guard that covers a top portion of the saw blade to supply a stream of coolant to the saw blade and the work piece, in order to cool down the accumulated heat during cutting and flushing away saw dust.

The fluid cooling bearing assembly comprises a hollow cylindrical bearing housing which has an axial shaft sleeve and two enlarged bearings cavities provided at two ends of the shaft sleeve to receive two roller bearings therein respectively, and a blade shaft which has a length longer than the bearing housing extending along the shaft sleeve of the bearing housing coaxially and being rotatably supported by the two roller bearings. The saw blade is rotatably mounted on a first end of the blade shaft.

The bearing housing further has a coolant chamber embracing around the shaft sleeve, which has a C-shaped cross section and is extended along the shaft sleeve. The bearing housing also provides a coolant inlet and a coolant outlet sealedly connected the coolant chamber with the coolant conduit arrangement. Therefore, the coolant would not only be pumped to cool the saw blade and the work piece to be cut, but also be pumped to flow inside the bearing housing for cooling the rotating blade shaft in order to prevent overheating of the roller bearings.

In order to enhance the cooling effect of the coolant flowing in the coolant chamber of the bearing housing, an ceiling surface of the coolant chamber is provided in wave form to increase the cooling contact area of the bearing housing.

BRIEF DESCRIPTION OF THE DRAWINGS

FIG. 3 is a left side view of the power saw according to the above preferred embodiment of the present invention.

DETAILED DESCRIPTION OF THE PREFERRED EMBODIMENT

Figure 1:
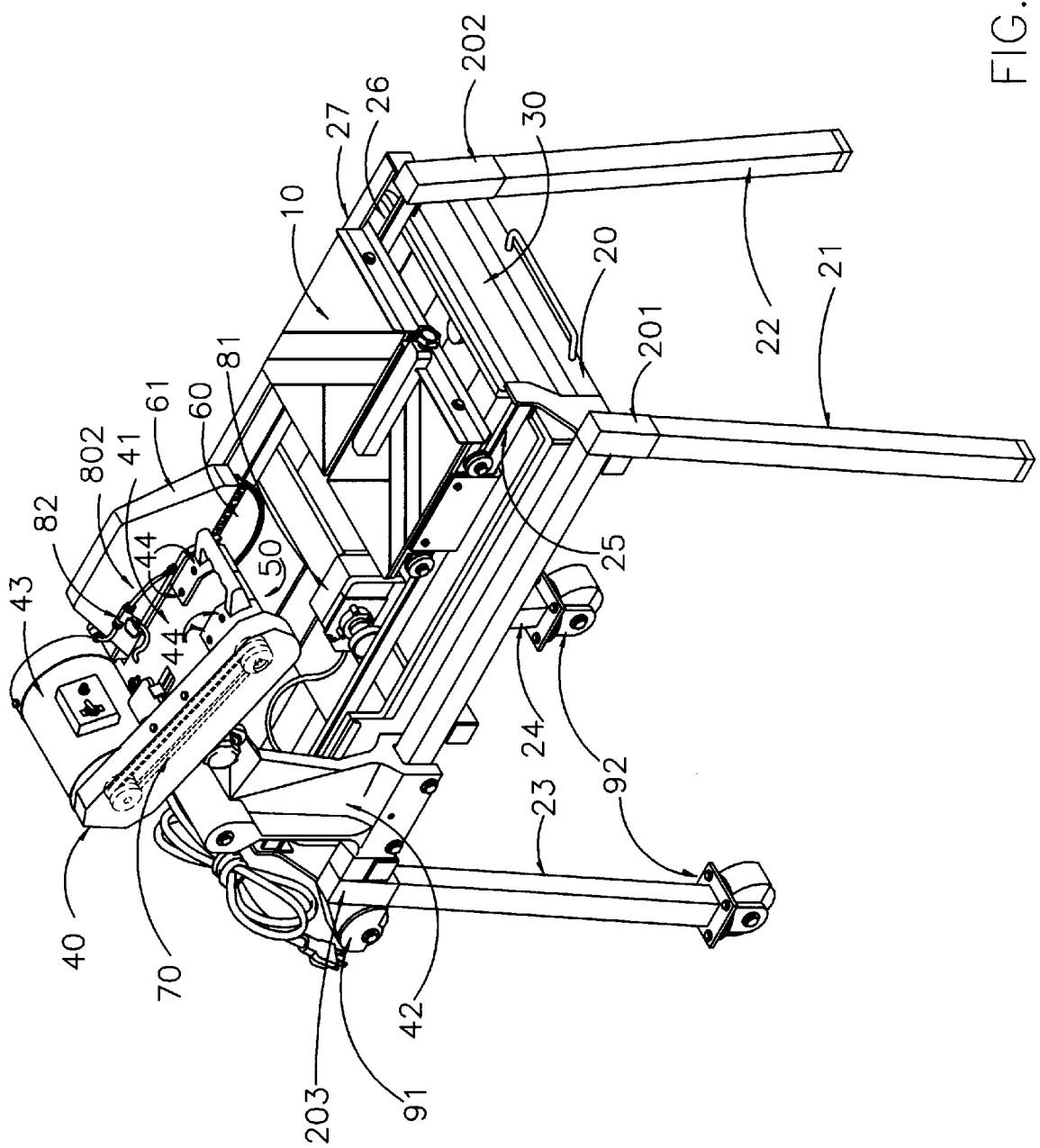
FIG. 1 is a perspective view of a power saw with fluid cooling bearing assembly according to a preferred embodiment of the present invention.

Referring FIG. 1 of the drawings, a power saw which is specifically designed for ceramic and masonry work pieces such as tiles according to a preferred embodiment of the present invention is illustrated. The power saw comprises a cutting table 10 slidably mounted on a supporting frame 20 which has four legs 21, 22, 23, 24 detachable connected thereunder, a coolant tray 30 disposed underneath the cutting table 10, and a cutting head arrangement 40 supported above the cutting table 10. The cutting head arrangement 40 includes a head platform 41 pivotally mounted on the supporting frame 20 by means of a pivot arm 42 affixed at one side of the supporting frame 20, a motor 43 mounted on a distal end of the head platform 41, a fluid cooling bearing assembly 50 which is firmly secured to a proximate end of the head platform 41 for rotatably mounting a circular saw blade 60, and a transmission means 70 for transmitting the rotating power of the motor 43 to the fluid cooling bearing assembly 50. According to the present embodiment the transmission means 70 comprises a drive belt 70 connected between the motor 43 and the fluid cooling bearing assembly 50.

Figure 5:
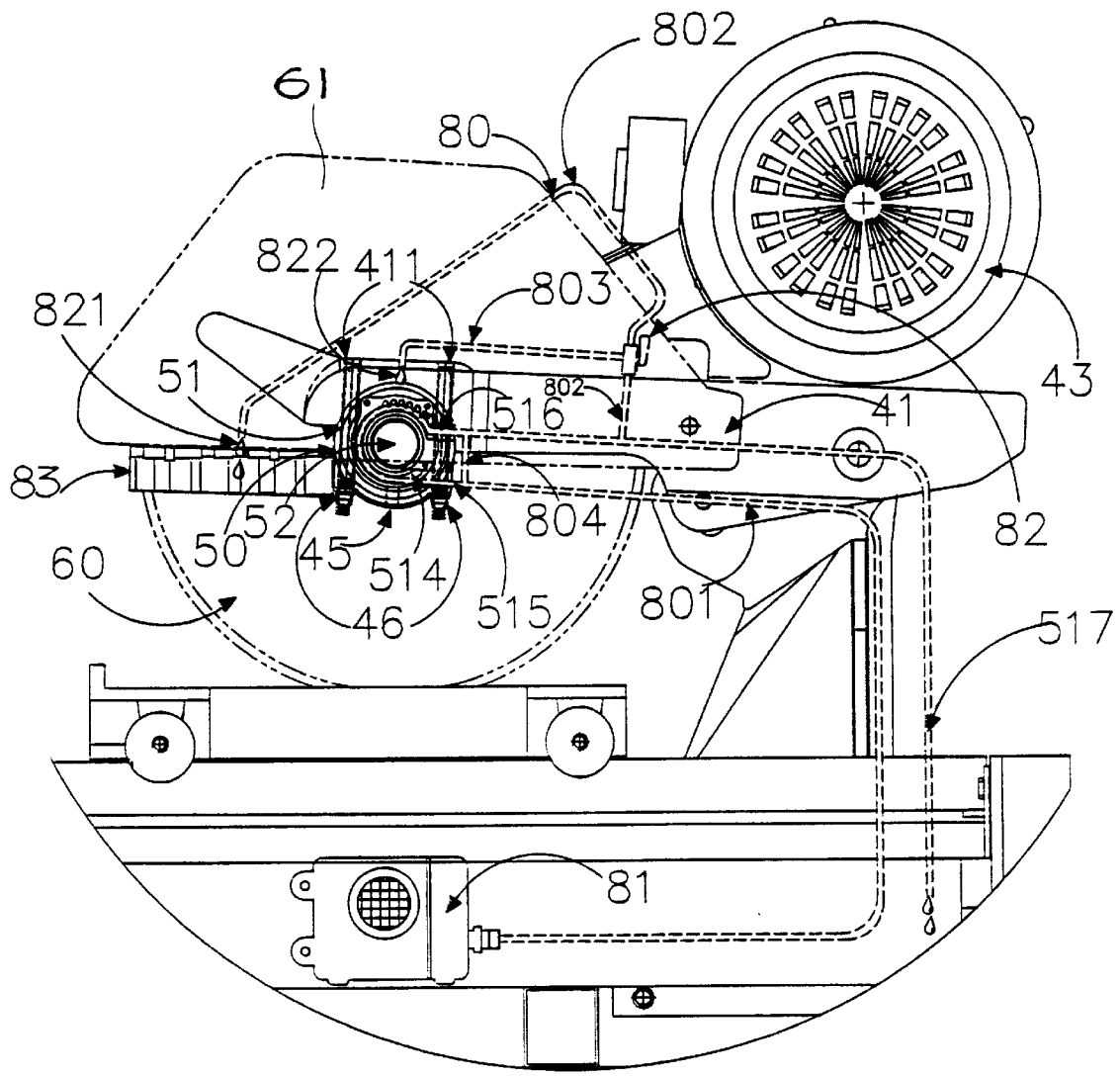
FIG. 5 is a partial enlarged view of the cutting head arrangement to illustrate the coolant conduit arrangement according to the above preferred embodiment of the present invention.

As shown in FIGS. 1 and 5, the power saw further comprises a fluid pump 81 immersed in the coolant provided in a coolant reservoir, which can be any other independent container or the coolant tray 30 according to the present embodiment, for pumping fluid coolant from the coolant reservoir (coolant tray) 30, via a coolant conduit arrangement 80, to at least a nozzle 821 connected to a blade guard 61 that covers a top portion of the saw blade 60 to supply a stream of coolant to the saw blade 60 and the work piece to be cut or shaped in order to cool down the accumulated heat during cutting and flushing away saw dust. The coolant can be any lubricant with cooling effect or simply water.

Figure 2A:
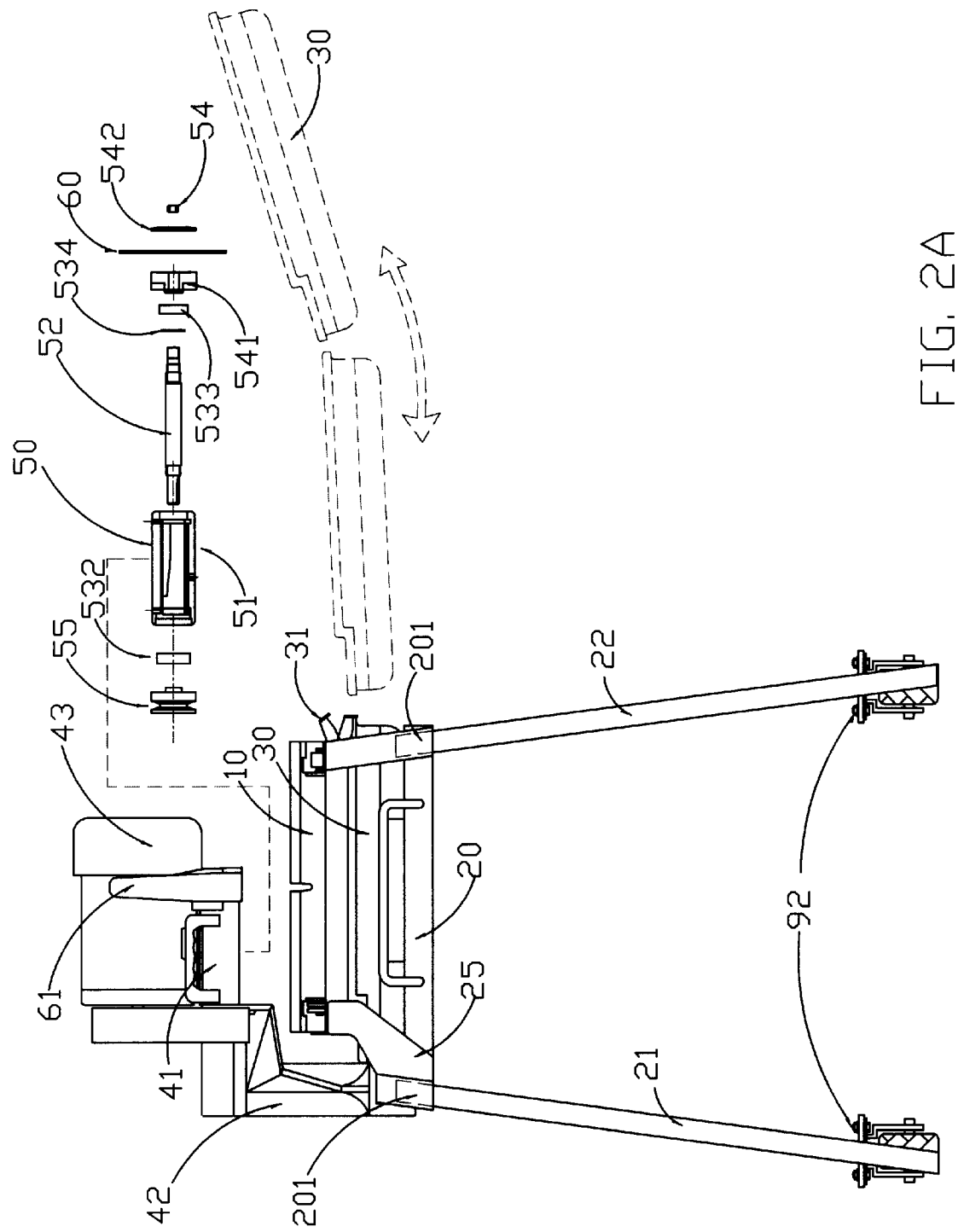
FIG. 2A is partial exploded and sectional front view of the power saw according to the above preferred embodiment of the present invention.
Figure 2B:
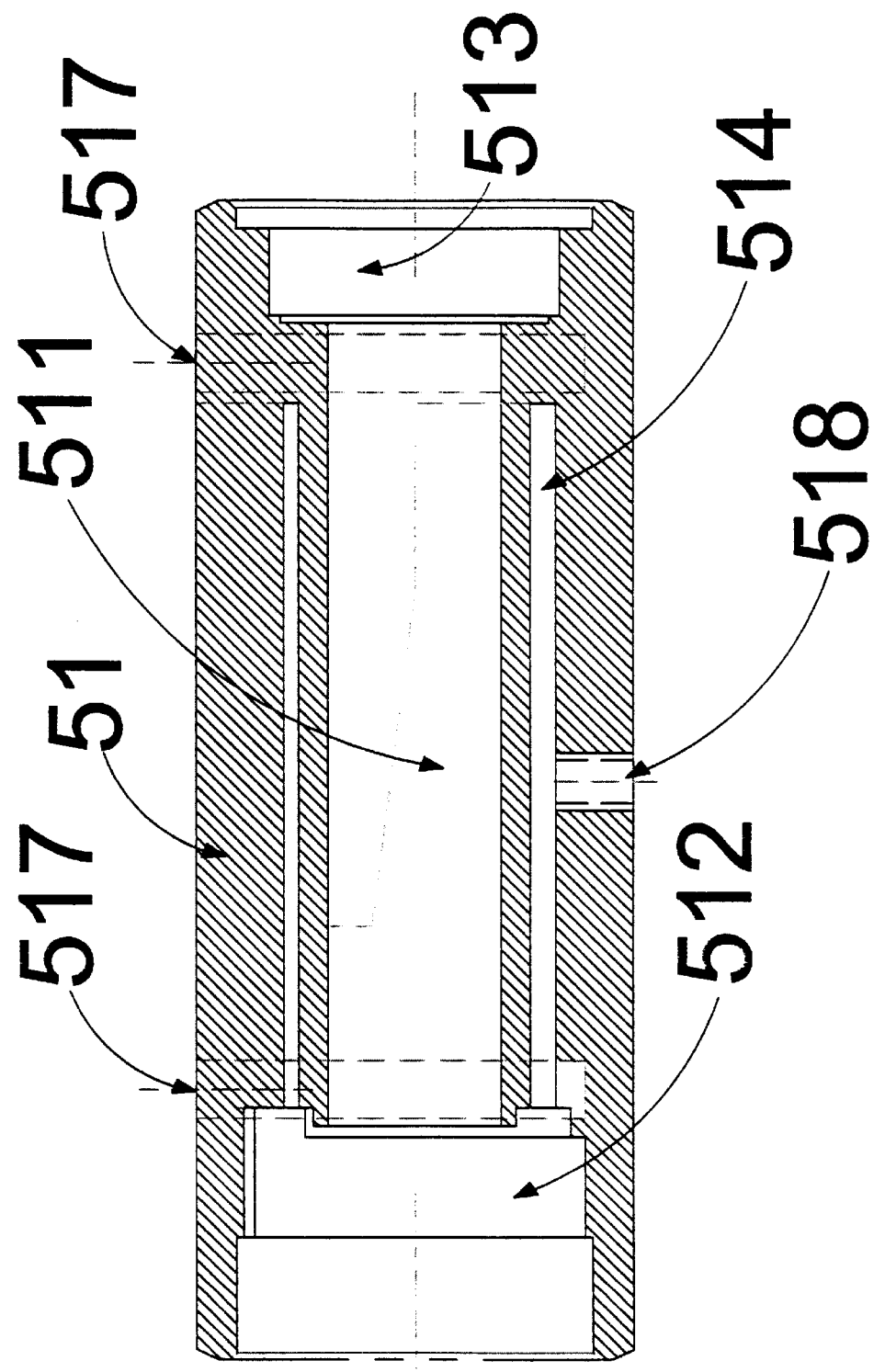
FIG. 2B is an enlarged sectional view of the bearing housing in FIG. 2A according to the above preferred embodiment of the present invention.
Figure 4:
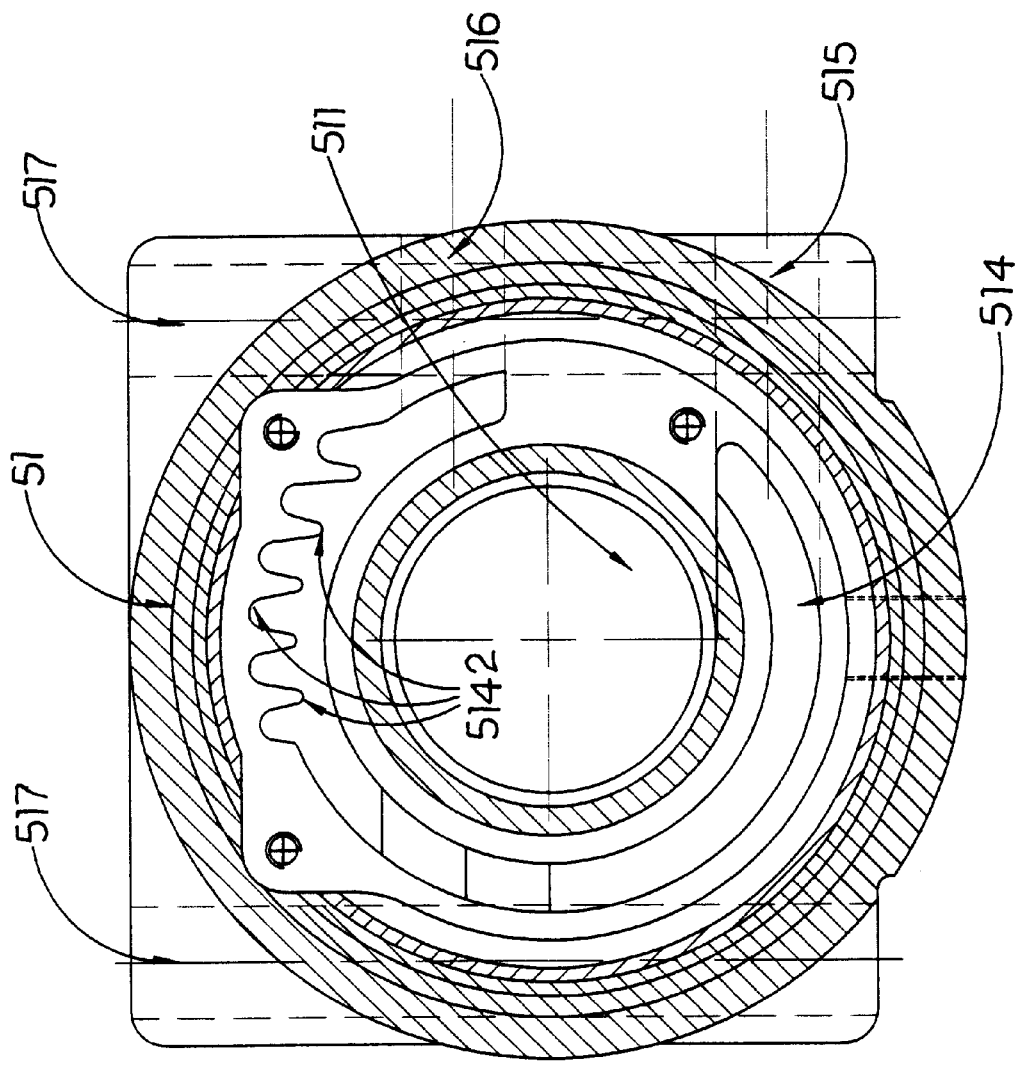
FIG. 4 is a sectional view of the bearing housing of the fluid cooling bearing assembly of the power saw according to the above preferred embodiment of the present invention.

Referring to FIGS. 2A, 2B and 4, the fluid cooling bearing assembly 50 comprises a hollow cylindrical bearing housing 51 and a blade shaft 52. The bearing housing 51 has an axial shaft sleeve 511 and two enlarged bearings cavities 512, 513 provided at two ends of the shaft sleeve 511 to mount two roller bearings 532, 533 therein respectively. The blade shaft 52, which has a length longer than the bearing housing 51, coaxially extends along the shaft sleeve 511 of the bearing housing 51 and is rotatably supported by the two roller bearings 532, 533. A seal bracket 534 is mounted on the shaft sleeve 511 before the roller bearing 533 to permanent seal the cooling chamber 514. An inner flange 541 is mounted on the blade shaft 52 to support the saw blade 60, which is rotatably mounted on a first end 521 of the blade shaft 52. A outer flange 542 is also mounted on the blade shaft 52 to hold the saw blade 60 in position by securing a lock nut 54 to a threaded portion of the first end 521 of the blade shaft 52. A pulley 55 is rotatably mounted on a second end 523 of the blade shaft 52 and driven by the drive belt 70.

As shown in FIGS. 2B and 4, the bearing housing 51 further has a coolant chamber 514 embracing around the shaft sleeve 511, which has a C-shaped cross section and is extended along the shaft sleeve 511. The water seal bracket 534 is adapted to keep the coolant recycle within the coolant chamber 514. The bearing housing 51 also provides a coolant inlet 515 and a coolant outlet 516 sealedly connected the coolant chamber 514 with the coolant conduit arrangement 80, as shown in FIG. 5. Therefore, the coolant would not only be pumped to cool the saw blade 60 and the work piece to be cut but also be pumped to flow inside the bearing housing 51 for cooling the bearing housing 51 in order to prevent overheating of the two roller bearings 532, 533. As shown in FIG. 2B, the bearing housing 51 further has a control screw 518 screwed thereunder.

As shown in FIGS. 3 and 5, there are two nozzles 821, 822 respectively attached to a central position of the blade guard 61 for enabling the coolant to discharge to the inner flange 541 and a front position of the blade guard 61 for enabling the coolant to discharge to the saw blade 60. The coolant conduit arrangement 80 is connected between the fluid pump 81 and the two nozzles 821 and 822 for transmitting the coolant pumped from inside the coolant ray 30 by the fluid pump 81 to discharge through the two nozzles 821, 822.

According to the present embodiment, for better circulation, the coolant inlet 515 is a lower hole penetrates through a lower portion of the bearing housing 51 into a lower half of the coolant chamber 514 and the coolant outlet 516 is an upper hole penetrates through an upper portion of the bearing housing 51 into an upper half of the coolant chamber 514. Therefore, coolant enters the lower half of the coolant chamber 514 through the coolant inlet 515 and flows to the upper half of the coolant chamber 514 in order to exit the coolant chamber 514 through the coolant outlet 516. Therefore, almost the entire shaft sleeve 511 is surrounded by the flowing coolant inside the coolant chamber 514 so as to cool down the heat generated by the two rotating roller bearings 532, 533 and transferred to the bearing housing 51.

In order to enhance the cooling effect of the coolant flowing in the coolant chamber 514 of the bearing housing 51, an ceiling surface of the coolant chamber 514 is provided in wave form to form a plurality of downwardly protruding fins 5142 so as to increase the cooling contact area of the bearing housing 51. Moreover, since heat transferred in the bearing housing 51 will flow up to the upper half thereof, the protruding fins 5142 formed on the ceiling surface of the coolant chamber 514 have a function of collecting and dissipating the heat in the bearing housing 51 to the coolant flowing within the coolant chamber 514.

As shown in FIGS. 1, 2B, 4 and 5, the proximate end of the head platform 41 provides with four locking holes 411 (as shown in FIG. 5). The bearing housing 51 has four vertical securing through holes 517 (as shown in FIGS. 2B and 4). A securing means which comprises four locking bolts 44, a steel made locking plate 45 and four locking nuts 46 is used to firmly mount the fluid cooling bearing assembly 50 to the proximate end of the head platform 41. The locking plate 45 is specifically shaped to attach on a bottom side of the bearing housing 51. As shown in FIGS. 1, 4 and 5, the four locking bolts 44 are respectively penetrated through the four locking holes 411 on the head platform 41, and the four securing through holes 517 of the bearing housing 51 and the locking plate 45. The four locking nuts 46 are respectively screwed to the four locking bolts 44 so as to firmly secure the bearing housing 51 with the proximate end of the head platform 41. Since the best material of the bearing housing 51 is aluminum for better heat dissipation, the locking plate 45 can prevent the locking nuts 46 from damaging the bearing housing 51 while tightly screwing against the bearing housing 51.

As shown in FIG. 5, the coolant conduit arrangement 80 comprises a first conduit 801 connected between the fluid pump 81 and the coolant inlet 515 of the bearing housing 51 via the pivot arm 42 and the head platform 41, a second conduit 802 which is extended through the head platform 41 and the blade guard 61 for connecting the coolant outlet 516 of the bearing housing 51 with the first nozzle 821 that is attached to the blade guard 61 in a position adjacent to the blade surface of the saw blade 60, a third conduit 803 which is disposed within the blade guard 61 for connecting the second conduit 802 with the second nozzle 822 that is attached to the central portion of the blade guard 61 in order to discharge coolant to the inner flange 541, a by-pass conduit 804 connected between the first conduit 801 and the second conduit 802 and adjacent to the coolant inlet 515 and the coolant outlet 516, a control valve 82 is connected to a junction of the second conduit 802 and the third conduit 803 so that when the control valve is shut, no coolant will be flow to the first and second nozzles 821, 822, and a return conduit 817 connected from the second conduit 802 (i.e. the coolant outlet 516) to the coolant tray 30.

Accordingly, coolant in the coolant tray 30 is pumped by the fluid pump 81 to enter the coolant chamber 514 of the bearing housing 51 via the first conduit 801. The incoming coolant inside the coolant chamber 514 is used to dissipate the heat transferred from the rotating roller bearings 532, 533 by flowing inside the bearing housing 51. The coolant inside the coolant chamber 514 flows up to exit through the coolant outlet 516.

When the control valve 82 is opened, the coolant emitted from the coolant outlet 516 flows into the second conduit 802 that will further transmit the coolant to the first nozzle 821 and the second nozzle 822 via the third conduit 803. The first nozzle 821 supplies a stream of coolant to the saw blade 60 for cooling down the saw blade 60 and flushing away saw dust. The second nozzle 822 also supplies a stream of coolant to the inner flange 541 so as to prevent the heat generated in the saw blade 60 during cutting from transferring to the fluid cooling bearing assembly 50.

The coolant flowing off of the saw blade 60 and the sludge formed from the coolant mixing with the saw dust are collected in the coolant tray 30 placed beneath the cutting table 10. When the power saw is switched off, the by-pass conduit 804 forms a fast passage for the coolant returning to the coolant tray 30 so as to ensure no coolant will leave in the second and third conduits 802, 803 and within said coolant chamber 514.

The coolant flow can be adjusted by the control valve 82 so as to adjust the volume of coolant flow or to stop the coolant from flowing to the first and second nozzles 821, 822. When the user desires a dry cut under certain conditions such as in-house working environment and masonry cutting, the control valve 82 can be shut to stop coolant flowing from the coolant outlet 516 of the fluid cooling bearing assembly 50 to the first and second nozzles 821, 822. Under such condition, the coolant flowing out of the coolant outlet 516 will return to the coolant tray 30 via the return conduit 817.

When the user needs to clean the bearing housing 51, the following steps can be processed. First, unscrew the control screw 518. Second, close the control valve 82. Third, bend the return conduit 817 connected to the coolant outlet 516. Accordingly, the pump can reverse the coolant flow and clean the dirt in the bearing housing 51.

As shown in FIG. 5, a plastic brush 83 is attached to the front portion of the blade guard 61 that holds the both sides of the saw blade 60 in order to keep the coolant staying in the surfaces of saw blade 60 and cleaning the saw blade 60 before it cuts to the work piece. Besides, the plastic brush 83 has feature of limiting the coolant flowing wide spread due to the high speed rotation of the saw blade 60.

As shown in FIGS. 1, 2A and 3, the coolant tray 30 is placed on the supporting frame 20 which comprises a pair of side rails 25, 26 affixed to two opposing sides thereof to enable the cutting table 10 sliding along. One of the side rails 25 also features for holding the coolant tray 30 in position. Adjacent to the other side rail 26, a holding bracket 27 is pivotally mounted to the to an opposite side of the supporting frame 20 to hold the coolant tray 30 inside the supporting frame 20. However, the holding bracket 27 can be pivoted up to enable the coolant tray 30 removing side-way-out of the supporting frame 20 for refilling coolant and cleaning purposes, as shown in FIG. 2. Another advantage of the holding bracket is to protect the coolant tray from not being hit during transportation.

As shown in FIGS. 1 and 3, two auxiliary wheels 91 are affixed to a rear end of the supporting frame 20; two rolling wheels 92 are respectively affixed to bottom ends of the two legs 23, 24 which are attached to a rear end of the supporting frame 20. The four legs 21 to 24 are connected under the supporting frame 20 by inserting their top ends into four receiving tubes 201 to 204 provided at four corners of the supporting frame 20. Therefore, when the user has to transport the power saw by a transportation vehicle such as a pick-up truck, the user may first push or pull the power saw near the pick-up truck and place the two auxiliary wheels 91 on the edge of the pick-up truck. Then, detach the two rear end legs 23, 24 from the supporting frame 20. Afterwards, the user can easily push the heavy body of the power saw on the pick-up truck by means of the two auxiliary wheels 91. Finally, detach the two front end legs 21, 22 from the supporting frame 20. Reverse the above steps can also easily unload the power saw from the transportation vehicle. Moreover, the user may lift up the power saw with all the legs 21 to 24 removed for 45 degree, so that the power saw can also be carried on floor surface of the jobsite by only one person without any help.

Figure 6:
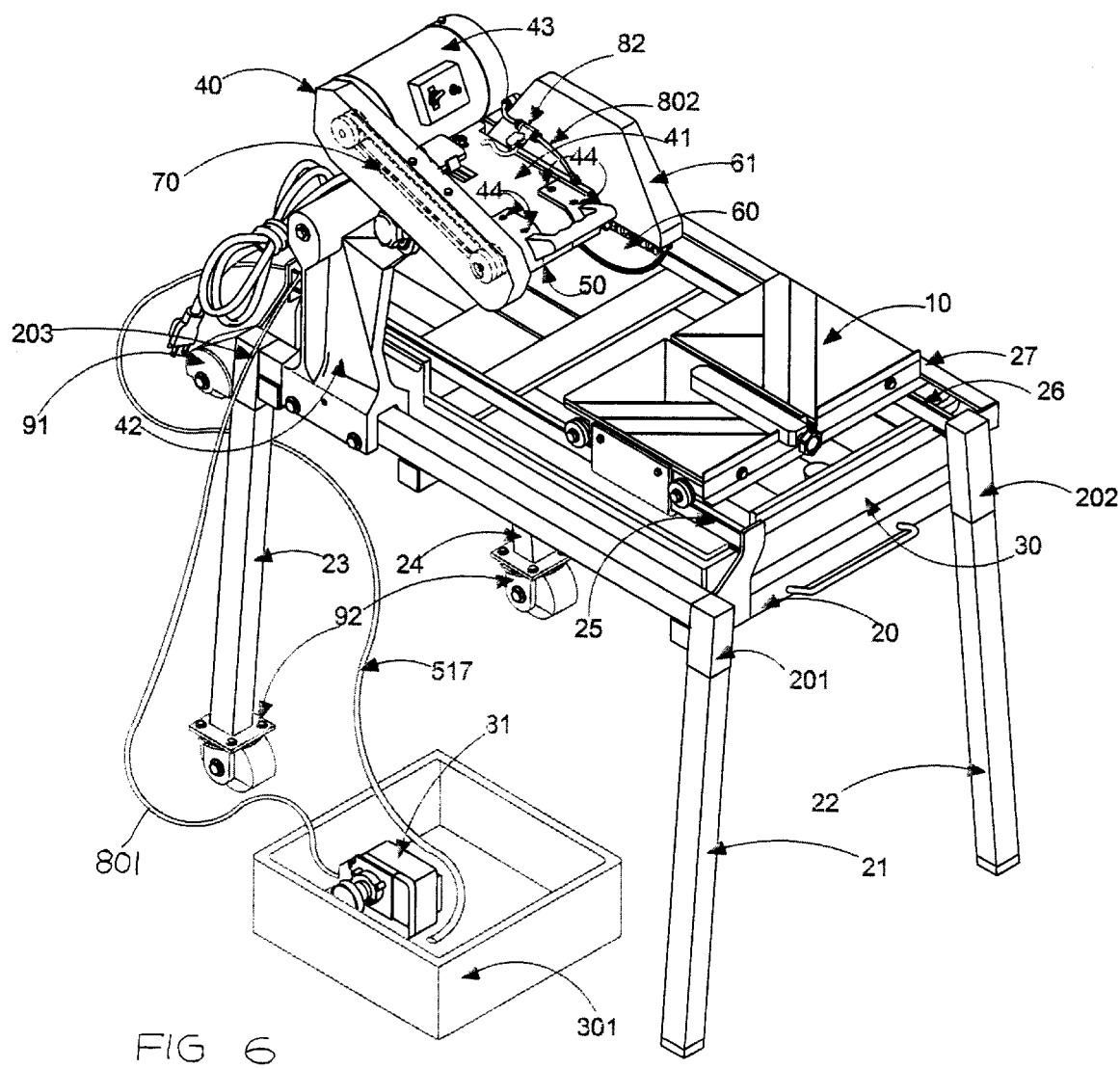
FIG. 6 is a perspective view of an alternative mode of the power saw with fluid cooling bearing assembly according to the above preferred embodiment of the present invention.

Referring to FIG. 6, an alternative mode of the above preferred embodiment is illustrated, wherein the fluid pump 81 is disposed in an additional coolant container 301 for supplying coolant to the fluid cooling bearing assembly 50 via the first conduit 801. It is especially practical when dry cut is required, wherein the control valve 82 is shut, so that the coolant will be pumped by the fluid pump 81 from the coolant container 301 to merely recycle inside the coolant chamber 514 of the bearing housing 51 of the fluid cooling bearing assembly 50. The coolant exiting from the coolant chamber 514 will all be collected and sent back to the coolant container 301 via the return conduit 817. Therefore, the saw blade can be kept continuously cutting without over heating the bearings 532, 533.

In view of the above disclosure of the preferred embodiment, it is apparent that the present invention can achieve the following advantages:

(1) The fluid cooling bearing assembly contains a built-in fluid cooling system to internally cool down the heat of the bearing assembly that can prolong the service life span thereof.

(2) The built-in fluid cooling system shares the fluid pump of the saw blade cooling system and the coolant collecting tray so as to eliminate the unnecessary cost for extra parts.

(3) The fluid cooling bearing assembly can be detached and reassembled easily.

(4) The power saw has a feature of ease of emptying the coolant tray positioned underneath the cutting table.

(5) The power saw has a detachable supporting frame that enables the user to easily unloading from or putting on a transportation vehicle.

What is claimed is:

1. A power saw, comprising a supporting frame;

a cutting table mounted on said floor supporting frame;

a cutting head arrangement supported above said cutting table, which includes a head platform pivotally mounted on said supporting frame, a motor mounted on said power saw, a fluid cooling bearing assembly which is firmly secured to said head platform for rotatably mounting a circular saw blade, and a transmission means for transmitting a rotating power of said motor to said fluid cooling bearing assembly, wherein said fluid cooling bearing assembly comprises a hollow cylindrical bearing housing which has an axial shaft sleeve and two enlarged bearings cavities provided at two ends of said shaft sleeve to receive two roller bearings therein respectively, and a blade shaft which has a length longer than said bearing housing extending along said shaft sleeve of said bearing housing coaxially and being rotatably supported by said two roller bearings, and that said saw blade is rotatably mounted on said blade shaft and driven by said transmission means to rotate; and a fluid pump for pumping a fluid coolant in a coolant reservoir via a coolant conduit arrangement to said saw blade to supply a stream of coolant to said saw blade for cooling down heat generated during cutting and flushing away saw dust, wherein said bearing housing further has a coolant chamber therein embracing around said shaft sleeve, said bearing housing also providing a coolant inlet and a coolant outlet to sealedly connect said coolant chamber with said coolant conduit arrangement, so that said coolant is not only pumped to cool said saw blade, but also be pumped to flow inside said coolant chamber for cooling said bearing housing in order to prevent overheating of said roller bearings.

2. A power saw as recited in claim 1 wherein said coolant chamber has a C-shaped cross section and is extended along said shaft sleeve.

3. A power saw as recited in claim 2 wherein a ceiling surface of said coolant chamber is provided in waveform to provide a plurality of protruding fins.

4. A power saw as recited in claim 3 wherein said coolant inlet is a lower hole penetrates through a lower portion of said bearing housing into a lower half of said coolant chamber and said coolant outlet is an upper hole penetrates through an upper portion of said bearing housing into an upper half of said coolant chamber, thereby coolant enters said lower half of said coolant chamber through said coolant inlet and flows to said upper half of said coolant chamber in order to exit said coolant chamber through said coolant outlet.

5. A power saw as recited in claim 4 wherein said coolant reservoir comprises a coolant tray disposed underneath said cutting table.

6. A power saw as recited in claim 5 further comprising a securing means for firmly securing said bearing housing with said head platform.

7. A power saw as recited in claim 5 wherein said coolant conduit arrangement comprises a first conduit connected between said fluid pump that is immersed within said coolant in said coolant reservoir and said coolant inlet of said bearing housing, a second conduit connecting said coolant outlet of said bearing housing with a first nozzle positioned adjacent to a blade surface of said saw blade, a third conduit connecting said second conduit with a second nozzle positioned near an inner flange mounted on said blade shaft for supporting said saw blade, and a by-pass conduit connected between said first conduit and said second conduit.

8. A power saw as recited in claim 7 wherein said coolant conduit arrangement further comprises a control valve connected to a junction of said second conduit and said third conduit so that when said control valve is shut, no coolant is flowed to said first and second nozzles, and a return conduit connected from said second conduit to said coolant tray.

9. A power saw as recited in claim 8 wherein said motor is mounted on a distal end of said head platform and said fluid cooling bearing assembly is firmly secured to a proximate end of said head platform.

10. A power saw as recited in claim 9 further comprising a securing means for firmly mounting said fluid cooling bearing assembly to said proximate end of said head platform.

11. A power saw as recited in claim 10 wherein said proximate end of said head platform provides with a plurality of locking holes and said bearing housing has a plurality of vertical securing through holes, said securing means comprising a plurality locking bolts and a plurality locking nuts, wherein said locking bolts are respectively penetrated through said locking holes provided on said head platform and said securing through holes of said bearing housing, wherein said locking nuts are respectively screwed to said four locking bolts so as to firmly secure said bearing housing with said proximate end of said head platform.

12. A power saw as recited in claim 11 wherein said securing means further comprises a locking plate which is specifically shaped to attach on a bottom side of said bearing housing and secured in position by said nuts for preventing said locking nuts from damaging said bearing housing while tightly screwing against said bearing housing.

13. A power saw as recited in claim 12 wherein said coolant tray is placed on said supporting frame which comprises a pair of side rails affixed to two opposing sides thereof to enable said cutting table sliding along, in which one of said side rails also features for holding said coolant tray in position, adjacent to said other side rail, a holding bracket being pivotally mounted to said to an opposite side of said supporting frame to hold said coolant tray from removing out of said supporting frame, however, when said locking bar is pivoted up, said coolant tray is able to remove out of said supporting frame for refilling coolant and cleaning purposes.

14. A power saw as recited in claim 13 wherein two auxiliary wheels are affixed to a rear end of said supporting frame and two rolling wheels are respectively affixed to bottom ends of said two legs attached to a rear end of said supporting frame, moreover said four legs are connected under said supporting frame by inserting four top ends thereof into four receiving tubes provided at four corners of said supporting frame.

15. A power saw as recited in claim 5 wherein said coolant tray is placed on said supporting frame which comprises a pair of side rails affixed to two opposing sides thereof to enable said cutting table sliding along, in which one of said side rails also features for holding said coolant tray in position, adjacent to said other side rail, a holding bracket being pivotally mounted to said to an opposite side of said supporting frame to hold said coolant tray from removing out of said supporting frame, however, when said locking bar is pivoted up, said coolant tray is able to remove out of said supporting frame for refilling coolant and cleaning purposes.

16. A power saw as recited in claim 2 wherein said coolant inlet is a lower hole penetrates through a lower portion of said bearing housing into a lower half of said coolant chamber and said coolant outlet is an upper hole penetrates through an upper portion of said bearing housing into an upper half of said coolant chamber, thereby coolant enters said lower half of said coolant chamber through said coolant inlet and flows to said upper half of said coolant chamber in order to exit said coolant chamber through said coolant outlet.

17. A power saw as recited in claim 1 wherein a ceiling surface of said coolant chamber is provided in waveform to provide a plurality of protruding fins.

18. A power saw as recited in claim 1 wherein said coolant reservoir comprises a coolant tray disposed underneath said cutting table.

19. A power saw as recited in claim 1 wherein said coolant conduit arrangement comprises a first conduit connected between said fluid pump that is immersed within said coolant in said coolant reservoir and said coolant inlet of said bearing housing, a second conduit connecting said coolant outlet of said bearing housing with a first nozzle positioned adjacent to a blade surface of said saw blade, a third conduit connecting said second conduit with a second nozzle positioned near an inner flange mounted on said blade shaft for supporting said saw blade, and a by-pass conduit connected between said first conduit and said second conduit.

20. A power saw as recited in claim 19 wherein said coolant conduit arrangement further comprises a control valve connected to a junction of said second conduit and said third conduit so that when said control valve is shut, no coolant is flowed to said first and second nozzles, and a return conduit connected from said second conduit to said coolant reservoir.

21. A power saw as recited in claim 1 wherein said motor is mounted on a distal end of said head platform and said fluid cooling bearing assembly is firmly secured to a proximate end of said head platform.

22. A power saw as recited in claim 21 further comprising a securing means for firmly mounting said fluid cooling bearing assembly to said proximate end of said head platform.

23. A power saw as recited in claim 22 wherein said proximate end of said head platform provides with a plurality of locking holes and said bearing housing has a plurality of vertical securing through holes, said securing means comprising a plurality locking bolts and a plurality locking nuts, wherein said locking bolts are respectively penetrated through said locking holes provided on said head platform and said securing through holes of said bearing housing, wherein said locking nuts are respectively screwed to said four locking bolts so as to firmly secure said bearing housing with said proximate end of said head platform.

24. A power saw as recited in claim 23 wherein said securing means further comprises a locking plate which is specifically shaped to attach on a bottom side of said bearing housing and secured in position by said nuts for preventing said locking nuts from damaging said bearing housing while tightly screwing against said bearing housing.

25. A power saw as recited in claim 1 wherein four legs are connected under said supporting frame by inserting four top ends thereof into four receiving tubes provided at four corners of said supporting frame respectively.

26. A power saw as recited in claim 25 wherein two auxiliary wheels are affixed to a rear end of said supporting frame and two rolling wheels are respectively affixed to bottom ends of said two legs attached to a rear end of said supporting frame.

27. A power saw as recited in claim 1 wherein two auxiliary wheels are affixed to a rear end of said supporting frame and two rolling wheels are respectively affixed to bottom ends of said two legs attached to a rear end of said supporting frame.

* * * * *